May 19, 1936.　　　P. H. STANLEY　　　2,041,028
BAROMETRIC DEVICE
Filed July 15, 1933
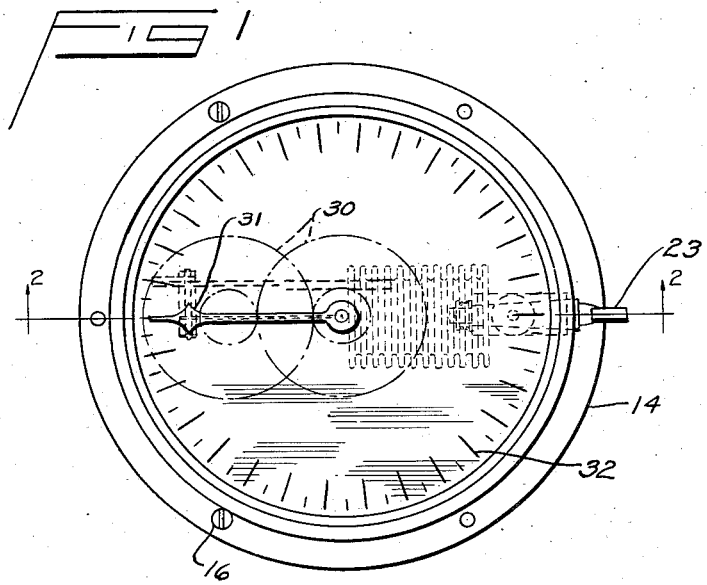
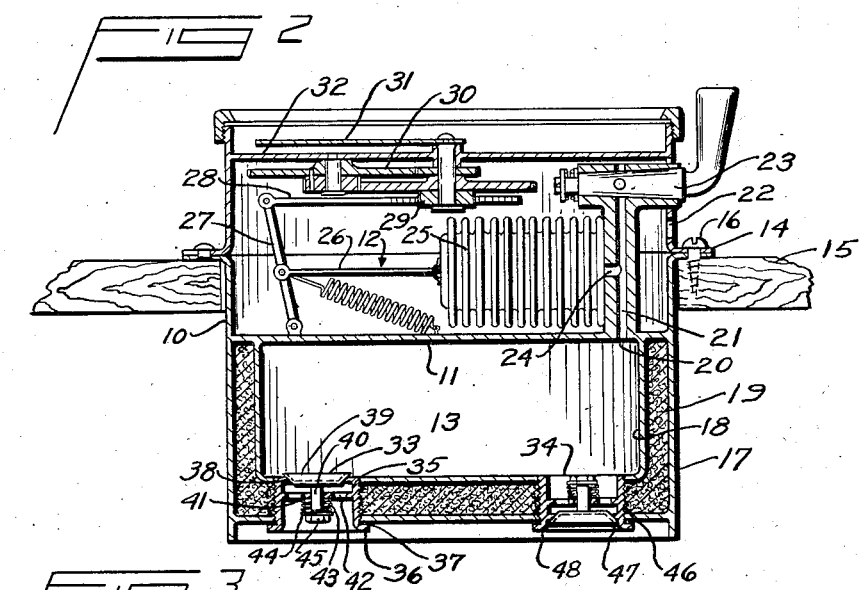
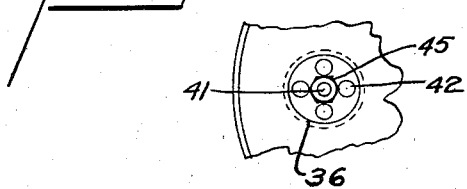
INVENTOR
PAUL H. STANLEY
ATTORNEYS Patented May 19, 1936

2,041,028

UNITED STATES PATENT OFFICE 2,041,028

BAROMETRIC DEVICE

Paul H. Stanley, Glenside, Pa.

Application July 15, 1933, Serial No. 680,616

7 Claims. (Cl. 73—4)

The present invention relates generally to barometric instruments and more particularly to an instrument of this type which is intended to indicate small differences of altitude on a magnified scale. The particular embodiment of the invention described herein is provided with a sensitive means responsive to slight changes in atmospheric pressure and with multiplying devices for indicating the extent of movement of the mechanism.

This invention also aims to provide means for temporarily effecting communication between the pressure responsive means and the atmosphere so that any desired elevation may be selected as a datum.

A still further object of the present invention is to provide in an instrument of this character, a safety mechanism adapted for automatically opening and closing communication between the pressure responsive means and the atmosphere as soon as a predetermined differential in pressure exists therebetween.

Other objects of the invention, consisting of novel features of construction and arrangement of parts, will become apparent on reference to the following detailed description which describes the invention in connection with the accompanying drawing.

In the drawing:

Fig. 1 is a top plan view of the barometric device.

Fig. 2 is a vertical sectional view taken on the line 2—2 of Fig. 1.

Fig. 3 is a detail end view of one of the valves illustrated in Fig. 2.

Referring more particularly to the drawing wherein corresponding parts are designated by like numerals throughout the several views thereof, the barometric device in the preferred embodiment of my invention herein illustrated comprises generally a casing 10 provided with a partition wall 11 to form an upper chamber 12 and a lower chamber 13. The upper portion of the casing 10 is provided with an annular flanged portion 14 which is adapted to be secured to the dash or instrument board 15 of an aircraft or a motor vehicle by means of the screws 16. The lower chamber 13 is thermally insulated to eliminate any apparent change in external pressure due to expansion or contraction of air as the result of changes in air temperature. To this end the lower end of the casing 10 comprises an outer shell 17 and an inner shell 18 spaced therefrom and adapted to contain fluid under constant pressure for a given datum. The space between these shells is preferably filled with a substance 19 which is a poor conductor of heat, such, for example, as felt.

The partition 11 forms the upper wall of the inner shell 18 and is provided with an opening 20 which leads into the open end of a tubular conduit 21, the opposite end of the conduit 21 opening into the upper chamber 12. The upper chamber 12 is provided with a suitable vent 22 so that the pressure therein will at all times be equal to the prevailing atmospheric pressure. A manually operable valve 23 is mounted in the conduit 21 as shown in Fig. 1, so that when desired, the lower chamber 13 can be opened to the prevailing atmospheric pressure and any desired elevation may be readily selected as a datum.

The conduit 21 is further provided with a laterally disposed opening 24 which is adapted to communicate with the interior of a suitable pressure responsive device, herein illustrated in the form of a bellows 25. The bellows is supported within the upper chamber 12 concentrically about the opening 24 at its one end. The free end of the bellows has pivotally connected thereto a link member 26 which in turn is pivotally attached intermediate the ends of a second link 27, this latter being pivotally attached to the partition wall 11 of the casing at its lower end. The upper end of the link 27 has pivotally secured thereto the one end of a gear rack 28 adapted for meshing engagement with a prime mover pinion 29 of a motion amplifying gear mechanism, generally indicated by the numeral 30 and including the pointer 31 movable over a suitably calibrated scale 32. When it is desired to use a certain elevation as a datum, the valve 23 is opened so that the pressure within the bellows and lower chamber 13 becomes equalized with the atmospheric pressure. In so doing the indicating mechanism is automatically returned and a new zero indication is established. The valve 23 is then closed and as the device is carried further aloft, the bellows 25 will again expand owing to the decreased pressure in the upper chamber 12. After the bellows have been expanded to the limit of their design, or after the pointer has made a complete revolution over its scale, the valve 23 may again be opened and further elevation attained with reference to this new datum.

In the case of descent, the bellows will contract and eventually it becomes necessary to open the valve 23 to prevent complete collapse of the bellows or to prevent possible injury resulting to the delicate indicating mechanism.

In order to offset the probability of injury resulting in the event of failure of the operator to open the valve 23, there is provided in the lower end of the lower chamber 13, a safety mechanism which comprises generally a pair of safety valve devices generally indicated by the numerals 33 and 34.

The valve device 33 comprises generally a valve cage 35 which is screwed into threaded openings provided in the outer shell 17 and inner shell 18 in the manner indicated in Fig. 2. This valve cage is provided with an outer flanged portion 36 which bears against the surface of the outer shell 17, a gasket 37 being suitably interposed between the flanged portion of the valve cage and the surface of the outer shell in order to prevent leakage at this joint. This valve cage is formed on its upper end with a valve seat indicated by the numeral 38 upon which is adapted to seat a valve head 39. The valve stem 40 of the valve 39 bears in a web portion 41 formed in the valve cage, suitable opening 42 being provided in this web portion to afford a means of communication between the chamber 13 and the atmosphere, when the valve is open.

The lower end of the valve stem has mounted thereon a tensioned coil spring 43, one end of which bears against the web portion of the valve cage, the other end bearing against the washer 44 and the adjusting nut 45. By means of this arrangement, the tension of the spring 43 may be readily adjusted to regulate the opening and closing of the valve. In actual use, the tension of the spring is set so that when there exists a pressure difference of approximately one pound per square inch between the chamber 13 and the atmospheric pressure, the valve will automatically open.

The valve device 34 is identical in construction, with one exception, as the construction of the valve device 33 and a description of the one will suffice for both.

The exception referred to lies in the fact that the valve seat 47 of the valve device 34 is formed on the flanged portion 48 of its valve cage 46. By means of this arrangement it will be apparent that one valve opens into the lower chamber 13, while the other opens into the atmosphere and in the event of a differential in pressure occurring between the chamber 13 and the atmosphere greater than that for which the valves are regulated to open, one or the other of the valves will be automatically opened to obtain a desired pressure relation between the pressure of the fluid in the chamber 13 and the atmospheric pressure.

It is evident that those skilled in the art to which this invention appertains may vary the details of construction, as well as the arrangement of parts, without departing from the spirit of the invention and therefore, I do not wish to be limited to the above disclosure except as may be required by the appended claims.

What I claim is as follows:

1. An instrument of the class described comprising in combination a casing including a partition wall to provide an upper chamber and a lower chamber, said upper chamber having a vent communicating with the atmosphere, said lower chamber being thermally insulated, a pressure responsive bellows fixedly supported at its one end within said upper chamber, the other end of said bellows being arranged to be movable in response to variations in atmospheric pressure, means forming a communicative passage between the interior of said bellows and the interior of said lower chamber, mechanism in the upper chamber for indicating the extent of movement of said bellows, a normally closed manually operable valve adapted to be opened to afford communication between the atmosphere and said means and the interior of said bellows and valve means responsive to a predetermined differential in pressure between the atmosphere and the pressure in said bellows, said valve means having communication with said bellows through said lower chamber.

2. An instrument of the class described comprising in combination, a casing including a partition wall to provide an upper chamber and a lower chamber, said upper chamber having a vent communicating with the atmosphere, a pressure responsive bellows within said last mentioned chamber, said bellows being attached to said casing at its one end, the other end of said bellows being arranged to be movable in response to variations in the support afforded thereto by the internal pressure of said bellows against atmospheric pressure, means forming a communicative passage between the interior of said bellows and the interior of said lower chamber, mechanism in the upper chamber for indicating the extent of movement of said bellows, a normally closed manually operable valve adapted to be opened to afford communication between the atmosphere and said means and the interior of said bellows and pressure actuated valve means adapted to be automatically opened to afford communication between the atmosphere and the interior of said lower chamber and the interior of said bellows respectively when a predetermined pressure differential exists therebetween.

3. An instrument of the class described comprising in combination, a casing including a partition wall to provide an upper chamber and a lower chamber, said upper chamber having a vent communicating with the atmosphere, a pressure responsive bellows fixedly supported at its one end within said upper chamber, the other end of said bellows being arranged to be movable in response to variations in atmospheric pressure, means forming a communicative passage between the interior of said bellows and the interior of said lower chamber, mechanism in the upper chamber for indicating the extent of movement of said bellows, a normally closed manually operable valve adapted to be opened to afford communication between the atmosphere and said means and the interior of said bellows and pressure actuated spring controlled valve means mounted in said lower chamber, said valve means being so constructed and arranged such as to obtain an automatic opening of said valve means upon the occurrence of a predetermined differential in pressure between said chamber and the interior of said bellows and the atmosphere respectively.

4. An instrument of the class described comprising in combination, a casing including a partition wall to provide an upper chamber and a lower chamber, said upper chamber having a vent communicating with the atmosphere, a pressure responsive bellows within said last mentioned chamber, said bellows being attached to said casing at its one end, the other end of said bellows being arranged to be movable in response to variations in the support afforded thereto by the internal pressure of said bellows against atmospheric pressure, means forming a communicative passage between the interior of said bellows and the interior of said lower chamber, mechanism in the upper chamber for indicating the extent of movement of said bellows, a normally closed manually operable valve adapted to be opened to afford communication between the atmosphere and said means and the interior of said bellows and a pair of pressure actuated spring controlled valves mounted in said lower chamber arranged in such a manner with respect to one another such that when the internal pressure in said bellows and lower chamber is greater than the atmospheric pressure in a predetermined amount one of said valves is automatically opened in response to said differential in pressure and when the atmospheric pressure is greater than the internal pressure in said lower chamber and bellows the other valve is automatically opened, each valve being adapted to automatically close when the predetermined differential in pressure does not exist.

5. An instrument of the class described, comprising in combination, a casing including a partition wall to provide an upper chamber and a lower chamber, said upper chamber having a vent communicating with the atmosphere, a pressure responsive bellows fixedly supported at its one end within said upper chamber, the other end of said bellows being arranged to be movable in response to variations in atmospheric pressure, means forming a communicative passage between the interior of said bellows and the interior of said lower chamber, mechanism in the upper chamber for indicating the extent of movement of said bellows, a normally closed, manually operable valve adapted to be opened to afford communication between the atmosphere and said means and the interior of said bellows, a pair of pressure actuated spring controlled valves mounted in said lower chamber, one of said valves opening into said chamber, the other valve opening into said atmosphere, said valves being so constructed and arranged such that when the internal pressure in said bellows and chamber is greater than the atmospheric pressure in a predetermined amount said second valve is automatically opened in response to said differential in pressure, and when the atmospheric pressure is greater than the internal pressure in said chamber and bellows in a predetermined amount, said first valve is automatically opened, each valve being adapted to automatically close when the predetermined differential in pressure does not exist.

6. An instrument of the class described comprising in combination, a casing including a partition wall to provide an upper chamber and a lower chamber, said upper chamber having a vent communicating with the atmosphere, a pressure responsive bellows within said last mentioned chamber, said bellows being attached to said casing at its one end, the other end of said bellows being arranged to be movable in response to variations in the support afforded thereto by the internal pressure of said bellows against atmospheric pressure, means forming a communicative passage between the interior of said bellows and the interior of said lower chamber, mechanism, in the upper chamber for indicating the extent of movement of said bellows, a normally closed manually operable valve adapted to be opened to afford communication between the atmosphere and said means and the interior of said bellows, a pair of pressure actuated spring controlled valves mounted in said lower chamber arranged in such a manner with respect to one another such that when the internal pressure in said bellows and chamber is greater than the atmospheric pressure in a predetermined amount one of said valves is automatically opened in response to said differential in pressure and when the atmospheric pressure is greater than the internal pressure in said chamber and bellows the other valve is automatically opened, each valve being adapted to automatically close when the predetermined differential in pressure does not exist and means for adjusting the tension of the springs controlling the opening of said valves.

7. An instrument of the class described comprising in combination, a casing including a partition wall to provide an upper chamber and a lower chamber, said upper chamber having a vent communicating with the atmosphere, a pressure responsive bellows fixedly supported at its one end within said upper chamber, the other end of said bellows being arranged to be movable in response to variations in atmospheric pressure, means forming a communicative passage between the interior of said bellows and the interior of said lower chamber, mechanism in the upper chamber for indicating the extent of movement of said bellows, a normally closed manually operable valve adapted to be opened to afford communication between the atmosphere and said means and the interior of said bellows, and a safety mechanism associated with said lower chamber comprising an internal valve seat in the lower end of said chamber, a spring controlled valve seating thereon and opening into said chamber, an external valve seat in the lower end of said chamber and a second valve seating thereon opening into the atmosphere, said valves being so constructed and arranged such that when the internal pressure in said bellows and chamber is greater than the atmospheric pressure in a predetermined amount said last mentioned valve is automatically opened in response to said differential in pressure and when the atmospheric pressure is greater than the internal pressure in said chamber and bellows in a predetermined amount said first mentioned valve is automatically opened.

PAUL H. STANLEY.